United States Patent
Kerschbaum et al.

(10) Patent No.: US 11,318,979 B2
(45) Date of Patent: May 3, 2022

(54) CHANGEABLE-SHAPE STEERING WHEEL

(71) Applicant: Bayerische Motoren Werke Aktiengesellschaft, Munich (DE)

(72) Inventors: Philipp Kerschbaum, Munich (DE); Markus Wadepuhl, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 17/277,625

(22) PCT Filed: Sep. 16, 2019

(86) PCT No.: PCT/EP2019/074679
§ 371 (c)(1),
(2) Date: Mar. 18, 2021

(87) PCT Pub. No.: WO2020/058178
PCT Pub. Date: Mar. 26, 2020

(65) Prior Publication Data
US 2022/0024510 A1    Jan. 27, 2022

(30) Foreign Application Priority Data
Sep. 19, 2018   (DE) .................... 10 2018 215 989.0

(51) Int. Cl.
*B62D 1/06*   (2006.01)
(52) U.S. Cl.
CPC .................... *B62D 1/06* (2013.01)
(58) Field of Classification Search
CPC ... B62D 1/04; B62D 1/06; B62D 1/08; B62D 1/10; B62D 1/105; B62D 1/11;
(Continued)

(56) References Cited

U.S. PATENT DOCUMENTS

| | | | | |
|---|---|---|---|---|
| 646,912 A | * | 4/1900 | Lewis | B62D 1/04 74/552 |
| 2011/0226088 A1 | * | 9/2011 | Muller | B62D 1/08 74/552 |
| 2021/0070348 A1 | * | 3/2021 | Schmidt | B62D 1/10 |

FOREIGN PATENT DOCUMENTS

| | | |
|---|---|---|
| DE | 199 19 278 A1 | 11/2000 |
| DE | 103 16 350 A1 | 10/2004 |

(Continued)

OTHER PUBLICATIONS

Machine Translation of DE 10 2018 200 436, obtained Dec. 8, 2021.*

(Continued)

*Primary Examiner* — Richard W Ridley
*Assistant Examiner* — Brian J McGovern
(74) *Attorney, Agent, or Firm* — Crowell & Moring LLP

(57) ABSTRACT

A changeable-shape steering wheel of a motor vehicle has a steering wheel rim composed of a plurality of rim parts, of which some can be pivoted relative to one another, in order for it to be possible, in addition to a circular shape, for it to also be transferred into an approximately oval shape. In a neutral position of the steering wheel which is rotatable about a circular shape center point, the semi-major axis in an oval shape is oriented at least substantially horizontally. The rim parts are movable by way of levers which are provided on the steering wheel rim, such that, in the neutral position, the semi-major axis of the oval shape of the steering wheel is no longer than half the diameter in the case of a circular shape of the steering wheel. In the neutral position, central rim side parts are preferably connected rigidly to a central steering wheel hub structure, whereas a single actuator which brings about a shape change can pivot, and pivot back, the lower rim side parts in the neutral position of the (Continued)

steering wheel in the direction of the circular shape center point in the case of the transition from the circular shape to the oval shape.

4 Claims, 2 Drawing Sheets

(58) Field of Classification Search
CPC ........ B62D 1/183; B62D 1/181; B62D 1/185; B62D 1/19; B60R 21/09
See application file for complete search history.

(56) References Cited

FOREIGN PATENT DOCUMENTS

| | | |
|---|---|---|
| DE | 10 2008 045 918 A1 | 5/2009 |
| DE | 10 2008 045 919 A1 | 5/2009 |
| DE | 102018200436 A1 * | 7/2019 ............... B62D 1/08 |
| WO | WO 2008/107757 A2 | 9/2008 |

OTHER PUBLICATIONS

International Search Report (PCT/ISA/210) issued in PCT Application No. PCT/EP2019/074679 dated Dec. 17, 2019 with English translation (six (6) pages).
German-language Written Opinion (PCT/ISA/237) issued in PCT Application No. PCT/EP2019/074679 dated Dec. 17, 2019 (six (6) pages).
German-language Search Report issued in German Application No. 10 2018 215 989.0 dated Jul. 2, 2019 with partial English translation (14 pages).

* cited by examiner

CHANGEABLE-SHAPE STEERING WHEEL

BACKGROUND AND SUMMARY OF THE INVENTION

The invention relates to a changeable-shape steering wheel of a motor vehicle whose steering wheel rim is composed of a plurality of rim parts, of which some are pivotable relative to one another, in order, in addition to a circular configuration, also to be able to be converted into an approximately oval shape, wherein, in a neutral position of the steering wheel, which can be rotated about a circle shape central point, the semi-major axis in an oval shape is oriented at least approximately horizontally.

Reference is made to the following prior art documents: DE 10 2008 045 918 A1 and DE 10 2008 045 919 A1.

A changeable-shape steering wheel is particularly helpful for motor vehicles which are capable of travelling autonomously or in a highly automated manner, since it is possible over driving periods of relatively long duration in which the vehicle moves without intervention on the part of the driver (or generally on the part of a vehicle occupant) for the steering wheel, which is required by the driver during steering, to be brought into a shape which takes up little space (and thus is less disturbing). Various designs of steering wheels are known which can be converted from the customary circle shape into an oval shape and back, with it being preferable—other than in the case for example of a steering wheel rim which is relatively freely deformable in itself—for safety reasons for the steering wheel rim to be composed of a plurality of individual parts which can be pivoted relative to one another and which are intrinsically rigid and are referred to in the present case as rim parts.

The documents cited at the outset disclose steering wheel designs which meet the aforementioned requirements in that rim parts which, in a neutral position of the steering wheel (in this position, the vehicle steered by the steering wheel would be travelling straight ahead), as viewed in the vertical direction, lie centrally to the outer left or right (and thus at the level of the steering wheel center point with a circle shape of the steering wheel) are displaced further laterally outward if the steering wheel is converted from the circle shape into the oval shape. The fact that it is thus the case here that the dimension of the steering wheel increases, with a reduction in the vertical direction, in another direction, namely in the horizontal direction, is seen as a disadvantage.

Demonstrating a remedial measure for this problem that has been outlined is the object of the present invention.

This object is achieved by the features of the independent patent claim and is intended for a changeable-shape steering wheel characterized in that the rim parts can be displaced by way of a mechanism, which is provided on the steering wheel rim, in such a way that, in the neutral position, the semi-major axis of the oval shape of the steering wheel is not longer than half the diameter with a circle shape of the steering wheel.

Advantageous embodiments and developments form the content of the dependent claims, with it being possible in particular for the mechanism to be designed as a lever drive or lever mechanism. Expressed in simple terms, it is proposed to configure a mechanism in such a way that, in the neutral position of the steering wheel, the steering rim can as it were be collapsed toward the center point, to be precise by way of its upper and lower portions as viewed in the vertical direction, whereas the two lateral center portions of the steering wheel rim are not displaced. These lateral center portions, which are subsequently referred to as central rim side parts, can for this purpose be rigidly connected to the center point of the steering wheel.

What is proposed is a mechanism which is designed for example in the form of a lever drive (or with other mechanism elements, such as for example gearwheels) and which, starting from a pivoting movement of a first rim part, brings about pivoting of one or more further rim parts in such a way that the longitudinal extent of the steering wheel, which extends horizontally through the center point of the steering wheel (in a circle shape) in the neutral position of the steering wheel, remains at least substantially unchanged or does not increase. For this purpose, in each case a rim side part (referred to as "central rim side part") is provided (as viewed in the vertical direction) substantially centrally, that is to say lying to the left and right of the steering wheel center point on the aforementioned longitudinal extent in the neutral position, and is rigidly connected to the so-called steering wheel hub, that is to say a central base plate of the steering wheel, to be precise as is customary via a spoke.

Within the context of an advantageous development it is proposed, by means of a single actuator (for example in the form of an electric servomotor), which brings about a change in shape of the steering wheel, to pivot rim parts which lie at the bottom or top as viewed in the vertical direction in the neutral position of the steering wheel, in the direction of the circle shape center point (of the steering wheel) when transitioning from the circle shape to the oval shape, which is assumed when the vehicle moves autonomously over a relatively long period, that is to say without intervention on the part of the driver. Of course, this actuator is also intended to be able to effect a corresponding return from the oval shape to the circle shape, preferably with reversal of its direction of movement.

The elements of the mechanism, that is to say for example pivotable levers which, triggered by a pivoting movement of a first rim part, preferably bring about a suitable pivoting movement of at least one further rim part, are supported directly or indirectly (that is to say with interposition of a further mechanism element or lever) on the central rim side part, which is rigidly connected to the steering wheel hub. There can also be provision for one of the rim parts to be variable in length and for this purpose preferably to be configured with a telescopic design in order to allow changes in length which may be required when pivoting individual rim parts for the purpose of "collapsing" the steering wheel rim.

This and further features and advantages will also emerge from the following description of an exemplary embodiment with respect to the attached figures which show the key constituent parts, namely the central steering wheel hub and substantially only the left-side half of the steering wheel rim—for the sake of clarity, its right-side half is not illustrated—in two configurations of the steering wheel. Illustrated here is not only an abstracted basic illustration but also a plan view of an actually constructed version without trim parts.

DETAILED DESCRIPTION OF THE DRAWINGS

Figure 1A:
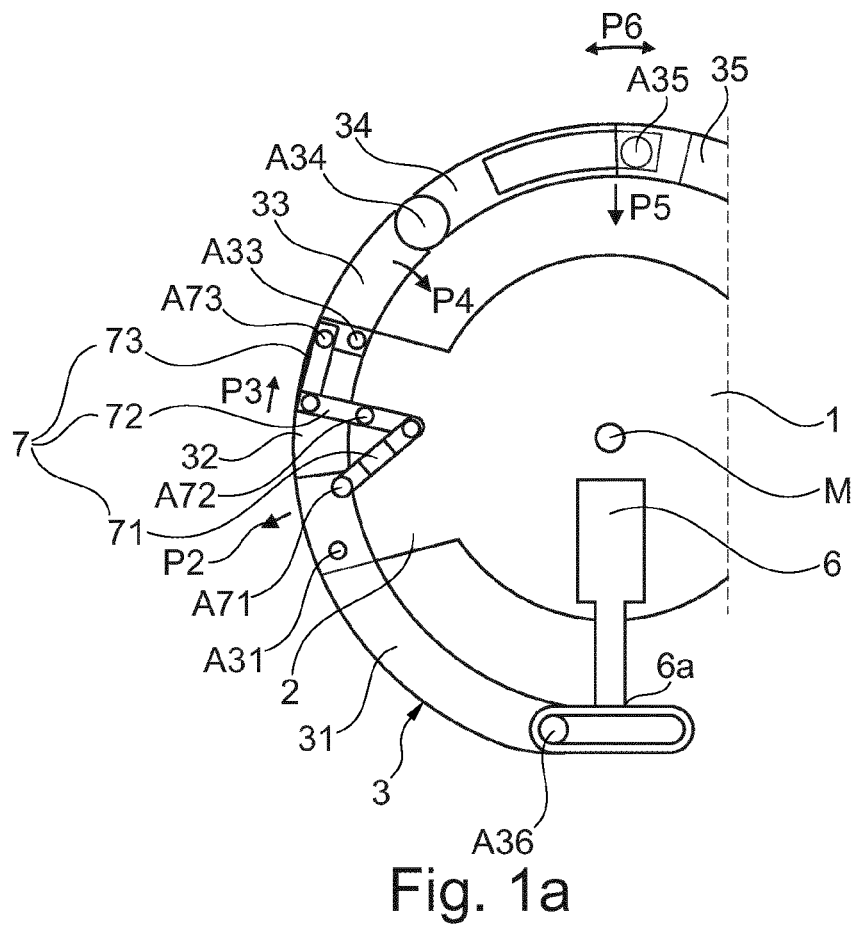
FIG. 1a shows the steering wheel in a circle shape in a basic illustration.

The reference number 1 denotes the central steering wheel hub, which practically forms a base plate which can be rotated about the center point M of the steering wheel in a circle shape and to which there is fastened, customarily at said center point M, a steering spindle by means of which, in the presence of a mechanical fallback level, a rotary movement of the steering wheel can be transmitted to steerable wheels of the motor vehicle. Emanating to the left and right of the steering wheel hub 1 in the shown neutral position of the steering wheel, and extending substantially horizontally at the level of the center point M, there is in each case a spoke 2 which transitions into a steering wheel rim, which is designated in its entirety by the reference number 3, and connects said rim to the steering wheel hub 1 and thus bears it. This steering wheel rim 3, which is gripped by the driver with a circle shape of the steering wheel in order to steer the vehicle using the steering wheel, is composed of a plurality of rim parts 31, 32, 33, 34 and 35 which each form a segment of the steering wheel rim 3 in the form of a circular arc.

For instance, so-called central rim side parts 32 are provided and fastened on the ends of the spokes 2 and are thus rigidly connected to the steering wheel hub 1, with the figures illustrating only the left-side central rim side part 32. Further rim parts or constituent parts of the steering wheel rim 3 are a so-called lower rim side part 31, which, as viewed in the vertical direction, is provided laterally below the center point M and has one of its ends pivotably fastened to the central rim side part 32, and also in the present case so-called further rim side parts 33 which are articulated on the left-side or right-side central rim side part 32 on the opposite side to the lower rim side part 31—and thus in the present case lying above the center point M, with it also being the case here that only the left-side further rim side part 33 is illustrated. Finally, there is also provided an assembly of two upper rim parts 34, 35 which together form a circular arc-shaped changeable-length rim part (the reference number 34/35 is used therefor in the text) which articulatedly connects the left-side further rim side part 33 to the right-side further rim side part 33 (not illustrated in the figures). For clarification, it should be mentioned once again that, with respect to a vertical extending through the center point M in the drawing plane, or with respect to a corresponding vertical plane in the installed state in the vehicle, the steering wheel 3 is configured to be mirror-symmetrical, with the exception only of the two upper rim parts 34, 35 or the changeable-length rim part 34/35 formed thereby. Here, the upper rim part 34 is articulatedly connected at the articulation point A34 to the further rim side part 33, and correspondingly the right-side end region of the upper rim part 35 is articulatedly connected to the right-side further side part 33 (not shown).

Figure 1B:
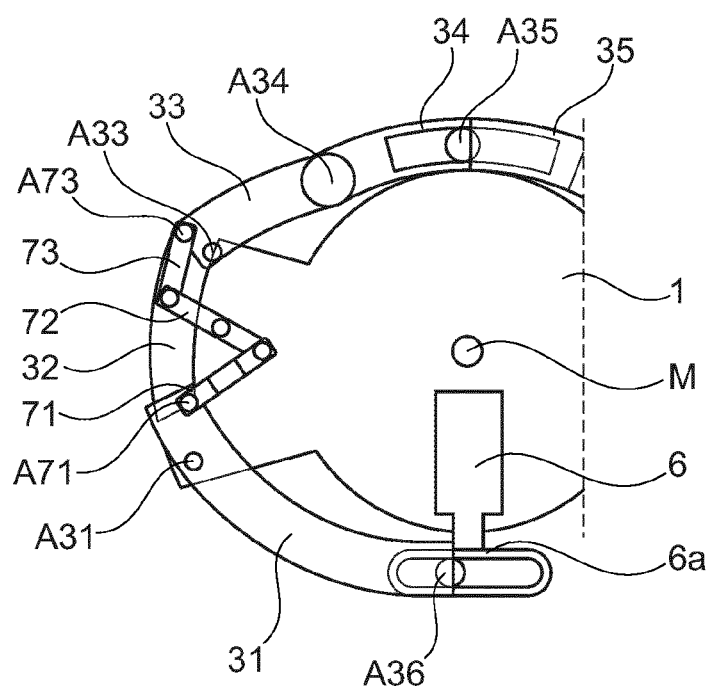
FIG. 1b shows the steering wheel in an oval shape and in a basic illustration.

Also provided is an actuator 6 which here, as viewed in the vertical direction, is fastened to the steering wheel hub 1 so as to lie at the bottom and has a displaceable actuating member 6a in which the free end of the lower rim side part 31, which has its other end fastened to the central rim side part 32 so as to be pivotable about an articulation point A31, is guided in a pivotable manner and so as to be slightly displaceable in the horizontal direction, for example as shown via a slotted guide A36. Also articulatedly or pivotably fastened to the central rim side part 32 (in each case on the left side and right side) is a lever drive, designated in its entirety by the reference number 7, which, in conjunction with a pivoting movement of the lower rim side part 31 that is initiated by the actuator 6, brings about a suitable pivoting movement of the further rim side part 33, which has its first end portion fastened to the central rim side part 32 so as to be pivotable about an articulation point A33. (It should be mentioned only for the sake of completeness that the so-called further rim side part would lie laterally below the center point if, as a departure from the embodiment illustrated here, the actuator were to lie above the center point M and hence also the rim side part which can be displaced by the actuator directly—that is to say without interposition of another rim part—were to lie above the center point M.)

Where mention is made in the present case of pivoting or pivotability, what is thus meant in the basic diagrams of FIGS. 1a, 1b is a rotary movement about an axis perpendicular to the drawing plane. The same applies where mention is made of an articulated connection which then allows such a pivoting movement. On the actual steering wheel according to FIGS. 2a, 2b, the steering wheel rim 3 describes a plane which has perpendicular thereto the respective pivot axis about which the pivotability or articulatability is present.

The individual displacement movements which are executed by the individual rim parts 31, 33, 34, 35 when converting the steering wheel from the circle shape (FIG. 1a, FIG. 2a) into the oval shape (FIG. 1b, 2b) are illustrated in FIG. 1a by means of arrows Px provided with reference numbers (x=1, 2, 3, 4, 5, 6) and will now be explained:

First of all, the actuator member 6a is displaced according to arrow P1 in the direction of the center point M, with the lower rim side part 31 being carried along and pivoted about its articulation point A31 (on the central rim side part 32) in such a way that its end portion, which projects slightly beyond the articulation point A31 with respect to the actuating member 6a, is pivoted according to arrow P2. At this just-mentioned end portion, a first lever 71 of the lever drive 7 is pivotably articulated at an articulation point A71, said lever thus likewise being displaced substantially according to arrow P2. This (substantially translational) displacement causes a second lever 72 of the lever drive 7, which is fastened to the central rim side part 2 so as to be pivotable about an articulation point A72 and is articulatedly connected by one end to the end of the lever 71 that is situated opposite to the articulation point A71, to be pivoted in such a way that a third lever 73 of the lever drive 7 is displaced according to arrow P3. Here, the third lever 73 is pivotably articulated on the second lever 72 at the end of the lever 72 that is opposite to the articulation point of the first lever 71. This displacement of the third lever 73 according to arrow P3 then brings about pivoting of the further rim side part 33, which is articulatedly connected thereto at an articulation point A73, according to arrow P4. In a comparable manner to the arrangement between the first lever 71 and the lower rim side part 31, the lever 73 is namely articulatedly connected, to be precise at the articulation point A73, to an end portion of the further rim side part 33 that at least slightly projects beyond the (articulated) articulation point A33 of the further rim side part 33 (on the central rim side part 32).

With the just-mentioned pivoting movement of the further rim side part 33, the changeable-length rim part 34/35 articulated thereto (and here lying at the top) is also displaced, to be precise downward according to arrow P5. On account of the fact here that the other end, the right-side end in the figures, of this changeable-length rim part 34/35 is articulatedly connected to the right-side further rim part (33) (not illustrated in the figures), the changeable-length rim part 34/35 has to shorten. For this purpose, this changeable-length rim part 34/35 is composed of the already mentioned circular arc-shaped upper rim parts 34 and 35 which are guided telescopically in one another (this is graphically illustrated by a slotted guide A35) and which, according to arrow P6, can as it were be slid one into the other.

Figure 2A:
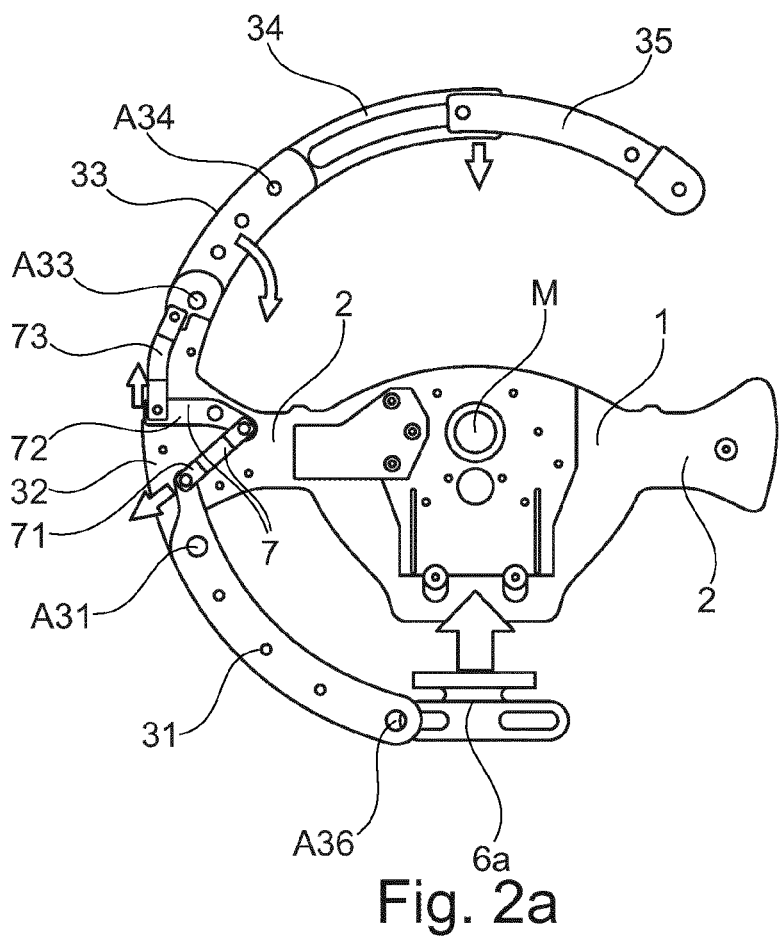
FIG. 2a shows the steering wheel in a circle shape as actually realized.
Figure 2B:
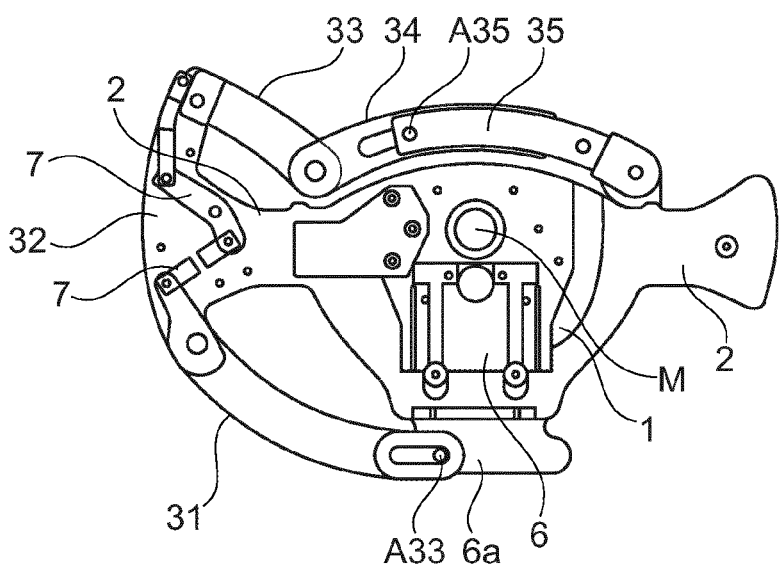
FIG. 2b shows the steering wheel in an oval shape as actually realized.

In FIGS. 2a, 2b, what is illustrated of the individual rim parts and the further structural elements is customarily referred to as the steering wheel skeleton. All the decorative and trim parts which normally cover the skeleton have been removed. Of course, such trim parts are configured in such a way that the described collapsing into the oval shape or a folding-apart of the steering wheel rim back into the circle shape is possible. The fact that the two parts of the steering wheel rim that are furthest away from the center point M in the horizontal direction of view in the neutral position, namely the central rim side parts 32, are rigidly connected to the steering wheel hub 1 ensures here that the semi-major axis of the oval shape of the steering wheel in the neutral position is not longer than half the diameter with a circle shape of the steering wheel. This condition should also be regarded as being satisfied if, upon pivoting of a rim part, a small corner region thereof, as viewed in the horizontal direction in the figures, in the oval shape projects beyond its position in the circle shape.

What is claimed is:

1. A changeable-shape steering wheel of a motor vehicle, comprising:
    a plurality of rim parts forming a steering wheel rim, some of which are pivotable relative to one another, in order, in addition to a circular configuration, to also be convertible into an approximately oval shape having a semi-major axis, the plurality of rim parts including a changeable-length rim part comprising two upper rim parts articulatedly connecting a left-side further rim side part to a right-side further rim side part, the two upper rim parts being interconnected by a slot guide so as to be guided telescopically, wherein
    in a neutral position of the steering wheel, which steering wheel is rotatable about a circular shape center point, the semi-major axis in the oval shape is oriented at least approximately horizontally,
    the plurality of rim parts are displaceable via a mechanism provided on the steering wheel rim such that, in the neutral position, the semi-major axis of the oval shape of the steering wheel is no longer than half a diameter of the circular configuration of the steering wheel.

2. The changeable-shape steering wheel according to claim 1, wherein
    central rim side parts in the neutral position are rigidly connected to a central steering wheel hub.

3. The changeable-shape steering wheel according to claim 1, further comprising:
    a single actuator which brings about a shape change and which, in the neutral position of the steering wheel, pivots lower rim side parts of the plurality of rim parts in the direction of the circular shape center point when transitioning from the circular configuration to the oval shape, and pivots the lower rim side parts back.

4. The changeable-shape steering wheel according to claim 3, wherein
    the lower rim side parts, which are directly pivoted by the actuator, acts via a lever drive as the mechanism, which is supported on an associated central rim side part, to bring about pivoting of the left-side and right-side further rim side parts, each of which is pivoted with respect to the associated central rim side part.

\* \* \* \* \*